United States Patent [19]

Bond

[11] Patent Number: 4,562,494
[45] Date of Patent: Dec. 31, 1985

[54] DISK DRIVE ALIGNMENT ANALYZER

[75] Inventor: Charles R. Bond, Milpitas, Calif.

[73] Assignee: Verbatim Corporation, Sunnyvale, Calif.

[21] Appl. No.: 482,906

[22] Filed: Apr. 7, 1983

[51] Int. Cl.$^4$ .............................................. G11B 5/56
[52] U.S. Cl. ........................................ 360/75; 360/78
[58] Field of Search ............................ 360/75, 77, 78

[56] References Cited

U.S. PATENT DOCUMENTS

| 4,458,275 | 7/1984 | Monti | 360/78 |
| 4,513,331 | 4/1985 | Baker et al. | 360/75 |
| 4,513,333 | 4/1985 | Young et al. | 360/77 |

OTHER PUBLICATIONS

IBM Technical Disclosure Bulletin, vol. 26, No. 1, Jun. 1983, pp. 171-173, Head-Alignment Technique, W. A. Overby.

Primary Examiner—George G. Stellar
Attorney, Agent, or Firm—Thomas E. Schatzel

[57] ABSTRACT

An alignment testing device comprising a magnetic media with data tracks in nonstandard locations with bidirectionally progressive degrees of misalignment for testing the alignment of the transducer head in a magnetic storage device such as a floppy disk drive. The alignment testing device allows the user to determine the boundaries of track alignments that the transducer head can read, and thereby determine any discrepancy between the heads actual alignment and correct alignment.

4 Claims, 5 Drawing Figures

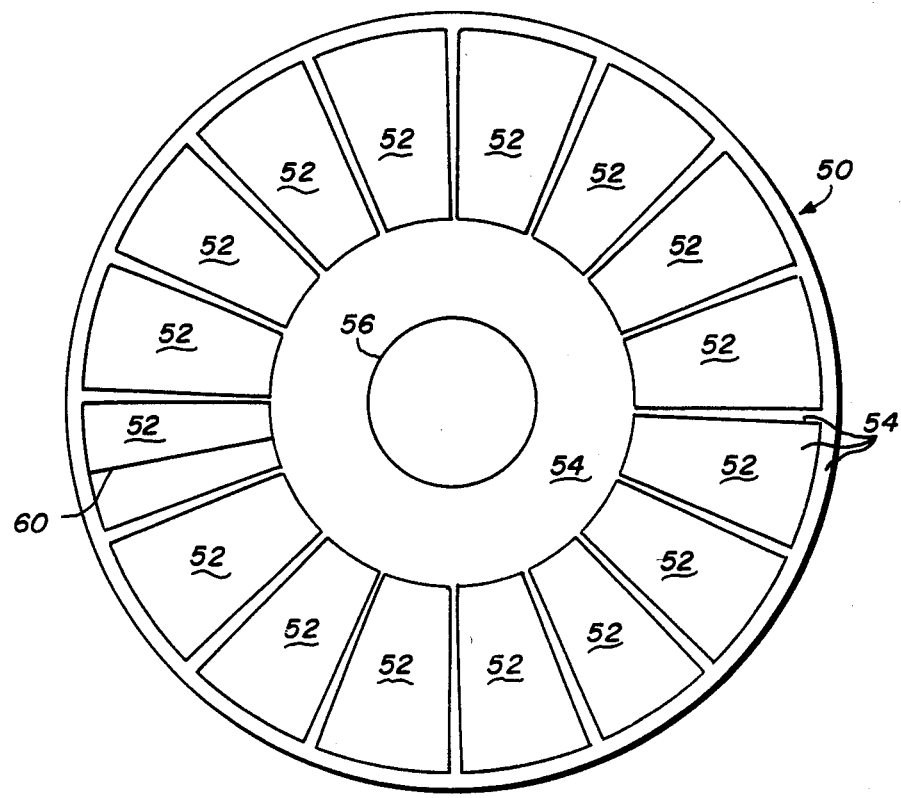
Fig_1
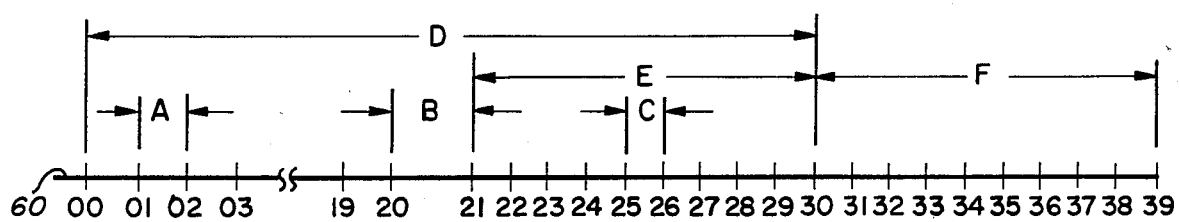
Fig_2
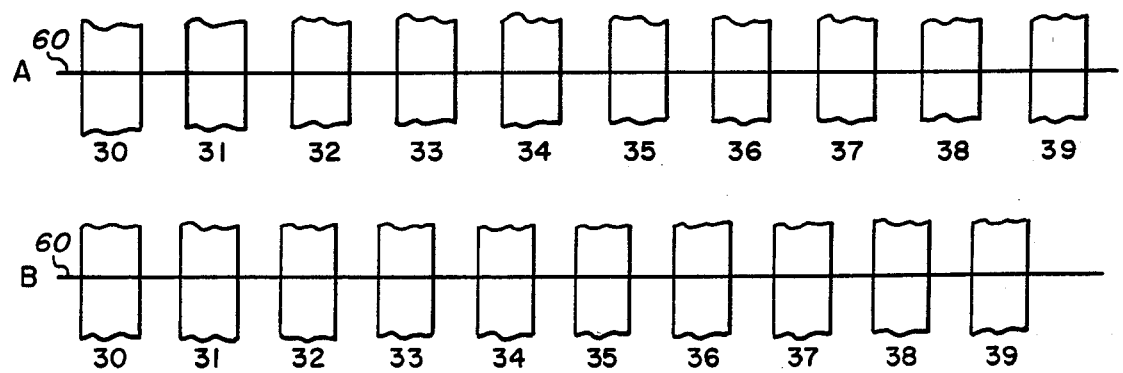
Fig_3

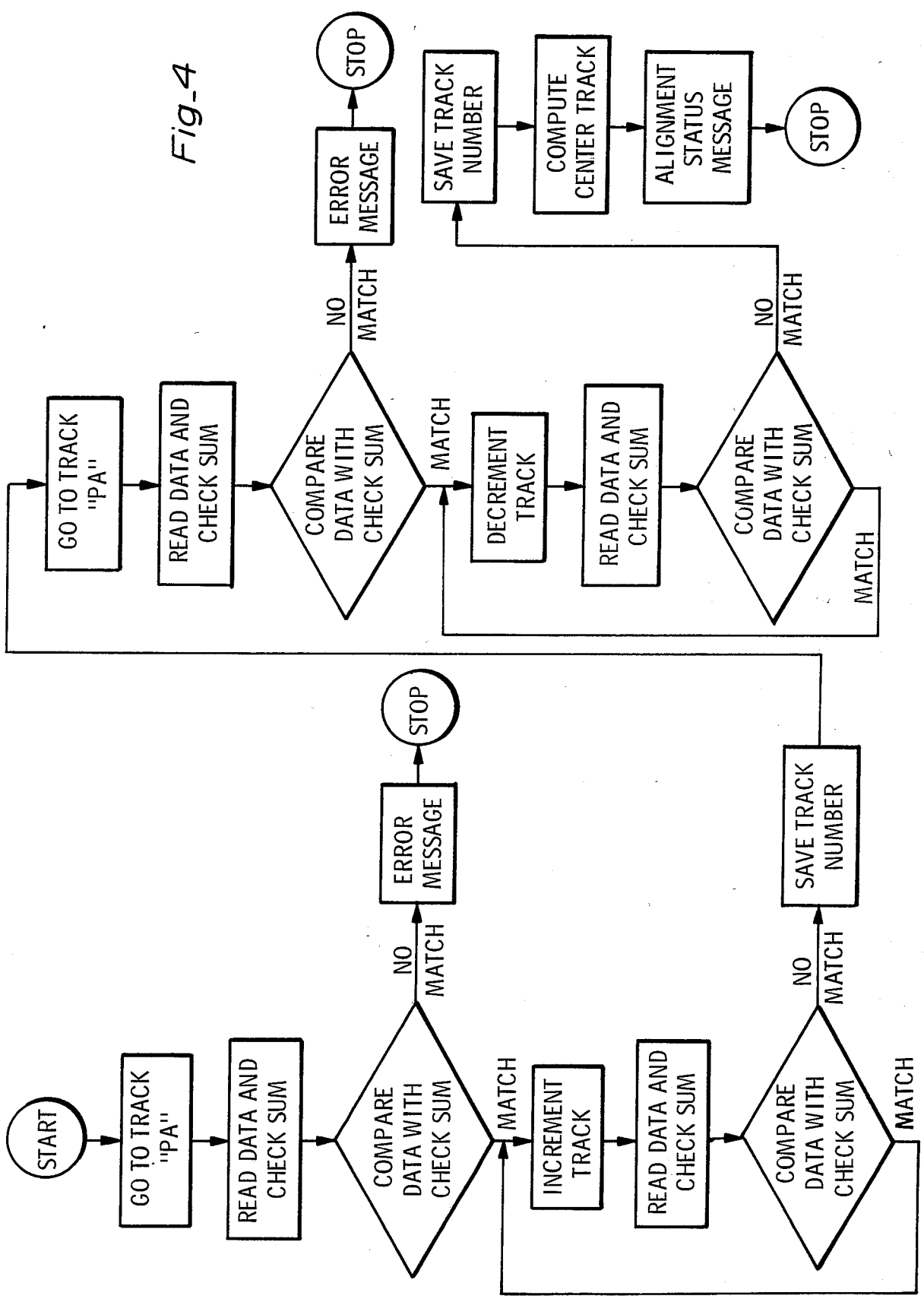
Fig._4

DISK DRIVE ALIGNMENT ANALYZER

BACKGROUND OF INVENTION

1. Field of the Invention

The invention relates generally to systems for testing transducer head alignment in magnetic media data storage devices, and more particularly to systems utilizing specially prerecorded data for testing such alignment. The invention will likely have primary application to alignment of transducer heads in floppy disk drives, although application to head alignment associated with hard media including hard disks and drums is feasible.

Proper alignment of the transducer head of a magnetic data storage device, with the data tracks on the magnetic media, is essential to proper data transfer. The recent promulgation of small computers, accompanied by both integral and separate disk drives has placed ever increasing numbers of magnetic storage devices in relatively unprotected environments. The relative vulnerability to mechanical damage of inexpensive disk drives associated with home and office small computers as compared with data devices associated with large main frame computer installations is significant.

If a slight change occurs in the alignment of a transducer head of a disk drive system, that change will not affect the ability of the disk drive to reliably read data recorded on that same disk drive after such an alignment change occurred. Data recorded by a different disk drive, however, or data recorded by the same disk drive before the change in alignment occurred, may be unusable on said disk drive following such a change in alignment. A fundamental function of floppy disk data storage systems is the interfacing of data from different sources on different computers. In order to accomplish such transfer of data, it is necessary that disk drives be aligned to a common standard. The location of tracks on floppy disks is governed by ANS X3.82-1980. Although the practice as to method of formating data within those tracks varies between manufacturers, thus creating incompatibility between disks used with different manufacturers equipment, a common location of the data tracks results in a basic uniformity of floppy disk drive head alignment requirements irrespective of manufacturer.

While many methods of head alignment are possible, including complex servo systems which automatically adjust alignment, the common practice with respect to floppy disk drives has been to have head alignment consist of a manual adjustment performed by a service technician utilizing a specially recorded disk and an oscilloscope. The common "cats eye" alignment technique is described by Hersey, Jr. as background in U.S. Pat. No. 4,053,937. That technique, including various embellishments thereto such as that disclosed by the invention of Hersey, Jr. have dominated head alignment of floppy disk drives. Since such alignment requires special equipment and a qualified technician, many disk drive users relegate head alignment to the category of things generally ignored until a problem becomes apparent. Only when the problem has become severe is the disk drive taken to a service shop.

A problem which can occur involves gradual drift in disk drive head alignment. A user whose application tends toward frequent creation of new files with access frequently required of recent files and infrequently required of older files, may be totally unaware of any problem with the disk drive system even though significant head alignment drift has occurred. As long as the only data to be accessed was also recorded with the head misaligned, the misaligned head will properly read the data. Only when a disk recorded on a different disk drive or a disk recorded much earlier is accessed will there be any consequence of the head alignment shift. If the disk drive head alignment is then corrected, all of the data on recently recorded disks may thereby become inaccessible. An additional problem which can plague users is a condition where data recovery from the disk drive begins to become unreliable. It is not always easy for a user to determine the source of the problem. Malfunctions in the computer or in the disk drive controller can have symptoms similar to head misalignment.

A system by which a relatively nontechnical user can economically test the alignment of the disk drive head will allow the user both to obtain corrective action before misalignment becomes so severe as to threaten the effectiveness of data access, and to more effectively diagnose problems associated with ineffective data access.

SUMMARY OF THE PRESENT INVENTION

It is therefore an object of the present invention to provide a means by which a relatively nontechnical person can easily test head alignment of a magnetic storage device.

It is a further object of the present invention to provide an economical means by which the head alignment of a magnetic data storage device can be tested.

It is a further object of the present invention to provide a means by which the head alignment of a magnetic data storage device can be tested without the requirement of special test instrumentation such as an oscilloscope.

It is a further object of the present invention to provide a means by which the head alignment of a magnetic data storage device can be tested without disassembly of said device.

It is a further object of the present invention to provide a means for testing alignment of a head of a magnetic storage device which attains the above objects and further comprises a means of forming diagnosis of other possible problems in such a magnetic storage device.

Briefly, a preferred embodiment of the present invention comprises a magnetic media element such as a floppy disk which has data tracks recorded thereon in a nonstandard format. Said magnetic media element will have at least one track which is located in accordance with the expected location of a data track for a particular type of data storage system. For floppy disk drives, said track will be located in accordance with ANS X3.82-1980. Adjacent to, and on both sides of said track, are located a plurality of data tracks on radii which do not correspond to standard track locations. In the preferred embodiment, said tracks are located on a floppy disk with the distance between center lines of immediately adjacent tracks spaced 0.0013 inches closer together than the ANSI specified spacing for 48 TPI density. Said data tracks are formated with data and check sums which provide a check of the accuracy of data transfer. It is the track spacing which differentiates the format of said disk from the format of disks normally utilized with the disk drive being tested. One track is located in an ANSI specified track location, with nine tracks on each side thereof located in nonstandard locations. The difference between the location of each such track and the corresponding ANSI specified track location is 0.0013 inches times the number of tracks distant such track is from the track located in an ANSI specified location.

When said disk is inserted into a disk drive device with a properly aligned head, the head can be indexed to the track that is located on an ANSI specified radius and will correctly align with said track. When a properly aligned head is indexed to any of the tracks in nonstandard locations, an alignment error will be present. On tracks for which alignment error is sufficient to interfere with accurate data transfer, the data as read, and the check sum will not agree and the defective data transfer is thereby detected. Since the tracks are in a uniform (though nonstandard) spacing arrangement, symmetrical around a track in an ANSI specified location, the properly aligned head will be able to accurately read data stored in the track in the ANSI standard location, and will have progressively more likelihood of not accurately reading the stored data as data transfer is attempted from tracks progressively further from the track in an ANSI specified location.

Any head which is sufficiently close to proper alignment to be able to accurately transfer data from the track in an ANSI specified location will be able to accurately transfer data from some of the other tracks. By determining the first track in each direction from the track located in an ANSI specified location that the head is unable to read, and computing which track is midway between those two unreadable tracks, it is determined which track the head most closely aligns with. Since the tracks are of known offsets from proper alignment position by increments of 0.0013 inches, a close estimate of the alignment error of the head is thereby provided.

The disk is further provided with a plurality of tracks located in ANSI specified locations for containing a program for controlling the reading and evaluating of the results of reading the tracks in nonstandard locations. Also included in those tracks in ANSI specified locations are program and data for performing other tests on the disk drive, including testing RPM and eccentricity.

An advantage of the present invention is that it provides a means by which a relatively nontechnical person can easily test head alignment in a magnetic storage device.

Another advantage of the present invention is that it provides an economical means by which the head alignment of a magnetic storage device can be tested.

Another advantage of the present invention is that it provides a means by which the head alignment of a magnetic storage device can be tested without the requirement of special test equipment such as an oscilloscope.

Another advantage of the present invention is that it provides a means by which head alignment of a magnetic storage device can be tested without disassembly of said device.

A further advantage of the present invention is that it provides a means for testing alignment of a head of a magnetic storage device which achieves the above advantages, and further comprises a means of forming diagnosis of other possible problems in such a magnetic storage device.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a schematical top view of a flexible magnetic data storage disk illustrating a typical approach to the locating of data on such a disk;

FIG. 2 is an enlarged diagramatic view showing the relative spacial positioning of data track center lines in accordance with the preferred embodiment of the present invention;

FIG. 3A is an enlarged diagramatic view showing the locations of tracks 30–39 when located in accordance with ANS X3.82-1980;

FIG. 3B is an enlarged diagramatic view showing the location of tracks 30–39 located in accordance with the preferred embodiment of the present invention and allowing comparison with the standard spacing illustrated in FIG. 3A; and FIG. 4 is a flow chart illustrating a process by which the present invention may be used to accomplish the testing of the alignment of a head in a magnetic media storage device.

DETAILED DESCRIPTION OF THE PREFERRED EMBODIMENT

In FIG. 1 there is illustrated a typical floppy disk referred by the general reference number 50. The data stored on disk 50 is stored in data tracks (described later) and is arranged in a plurality of sectors 52. Disk 50 is illustrated with sixteen sectors 52, although it should be recognized that other quantities of sectors, including ten, thirteen, fourteen and twenty-six, are commonly used in the art, and all are consistent with the present invention. The usual form in which data is stored on disks like disk 50 is to utilize most of each track in sectors 52 for storage of data, while reserving one or more bytes (sets of eight binary digits) on each track at the end of each such sector 52 for a check sum sometimes referred to as an error detection code. Such a check sum consists of the least significant portion of the sum of all of the data stored in the sector 52 with which such check sum is associated. By reading the data within one of sectors 52, summing that data and comparing the sum with the data in the check sum byte(s), a determination is made as to whether the data was accurately read.

Disk 50 is provided with a coating 54 of magnetizable material which is commonly applied to the entire surface of one or both sides of disk 50. It is necessary that the entire area of sectors 52 be provided with coating 54. It should be recognized that both single and double-sided recording is common, and that if double-sided recording is utilized, both sides of disk 50 must be provided with coating 54. The division of disk 50 into sectors 52 is done entirely through the recording process, and represents the location of magnetically stored information, not the location of coating 54 which is on the entire surface of disk 50. Disk 50 is provided with an aperture 56 in its center for centering on the disk drive.

In FIG. 2 there is illustrated the relative spatial positions of the various tracks as located within sectors 52 on disk 50. A radial line 60 is provided as a reference line for illustration of track positioning. The typical positioning of line 60 is also shown in FIG. 1, and it should be recognized that line 60 represents any radial line through a sector 52. Progression from left to right along line 60 as illustrated in FIG. 2 represents progression from outside tracks to inside tracks through sectors 52 of disk 50.

In the preferred embodiment of the present invention, a forty track format on a 5¼ inch diameter floppy disk, with such tracks spaced in a nominal forty-eight TPI format is utilized. The actual track positioning is illustrated by location of the center lines of the tracks 00 through 39 as shown along radial line 60. Each of tracks 00 through 20 are located in accordance with ANS X3.82-1980 which results in the spacing between center lines of adjacent tracks, illustrated as Dim. "A", of approximately 0.02083. Track 30 is also located in accordance with ANS X3.82-180, and is therefore located a distance of 30 times Dim. "A" from track 00. Since track 30 is in a standard position, it is referred to as a properly aligned track, or track "PA". The remaining tracks are located at non-standard radii, spaced in uniform increments from track 30. Dim. "C" represents the distance between center lines of tracks 21 through 39. In the preferred embodiment, Dim. "C" is established approximately 0.0013 inches less than Dim. "A". There are nine tracks on each side (radially inside and radially outside) of track 30, all of which differ from the standard location by an amount equal to 0.0013 inches times the number of tracks distant each such track is from track 30. The tracks therefore vary from standard locations by a distance from 0.0013 inches for tracks 29 and 31, to 0.0117 inches for tracks 21 and 39. ANS X3.82-1980 establishes the track width at 0.0118 inches. It can be seen that the tracks in nonstandard locations vary in both directions from standard locations by amounts ranging from approximately 1/9th of a standard track width to an amount approximately equal to a standard track width. Dim. "E" and Dim. "F" are equal to each other, and are each equal to nine times Dim. "C". It can be seen that tracks 21 through 39 take up less radial space than they would if they were located in standard locations as specified in ANS X3.82-1980. As a consequence, Dim. "B" is greater than Dim. "A" by an amount sufficient to compensate for the reduced-from-standard spacing of Dim. "C" while allowing track 30 to be located in a standard location. Tracks 1 through 20 are used to store computer programs and other data, and tracks 21 through 29 are used for testing of head alignment through attempted reading of those tracks.

FIGS. 3A and 3B illustrate the relative positioning of tracks 30 through 39, with FIG. 3A illustrating the positioning specified in ANS X3.82-1980, and FIG. 3B illustrating the positioning of tracks in accordance with the present invention. A similar relationship exists for tracks 21 through 29, with all of the tracks in nonstandard locations appearing slightly compressed towards track 30.

The flow chart of FIG. 4 illustrates a method whereby the present invention may be utilized to test alignment of disk drive transducer heads. In the flow chart, track "PA" refers to the properly aligned track on the disk 50, and is track 30 in the preferred embodiment, as described above. The process of utilizing disk 50 in accordance with the flow chart begins with indexing the transducer head to track "PA" and reading both the data and the check sums in the various sectors 52 of track 30. The data within each sector 52 is summed and compared with its corresponding check sum. If the data does not correctly compare with the check sums, an error message is presented and the test is terminated. In that condition, the disk drive was unable to correctly read data from a properly aligned track. The cause of the reading failure may be for various reasons other than improper alignment, but if alignment is the cause, the misalignment is severe.

If the data does correspond to the check sums, the head is incremented to the next track and the data and check sums again read and compared. As long as the data read corresponds to the check sums, the transducer head continues to be indexed to the next track, the data and check sums read, and the comparison therebetween made. At the first track in which erroneous readings occur, the sequence is altered. The track number of the track at which the reading error occurred is saved, and the transducer head is returned to track "PA".

Track "PA" is then read for a second time, its data and check sums again compared, and the test ended with an error message if the data does not correspond to the check sums. If track 30 (track "PA") is accurately read, however, the head is moved to the next lower numbered track (track 29) and the data and check sums read and compared. As long at the data and check sums correspond, the head will continue to be indexed through the decreasing numbered tracks, and the data and check sums read and compared. When a track is reached for which the data and check sums do not correspond, the sequence is again altered. The track number is also saved.

The numbers of the two tracks for which accurate data transfer was unsuccessfully attempted are added and the sum divided by two. The resulting number, if an integer, represents the track with which the head most closely aligns, and if containing a fraction of one-half, allows identification of the two adjacent tracks with which the head most closely aligns. Since each of tracks 21 through 29 and 31 through 39 are located at different positions of precise deviation from standard track locations, a very close estimate of the head alignment error is provided by identification of the track (or pair of adjacent tracks) with which the head most closely aligns. With the center line spacing of 0.0013 inches less than standard spacing, in accordance with the present invention, an estimate of the alignment error is thus achieved to about the nearest half track location, and thus a resolution of better than 0.001 inches is attained. This test result can be utilized in several ways. Examples include the utilization of the value of the alignment error to adjust the head alignment, or as an alternative, provide a test whereby the alignment is determined to be either "acceptable" or "unacceptable". While the amount of discrepancy which could be "acceptable" is subject to the application, including the normal tolerances attainable on a specific device, and the sensitivity of the particular read system of the disk drive, a discrepancy of one and one-half tracks (0.002 inches) can be used as a general limit beyond which any alignment error should be corrected. It should be noted that allowing an alignment error of up to 0.002 inches in each direction will allow various disk drives to have head alignment at different degrees of error. A disk which is recorded on a disk drive in which the head is aligned 0.002 inches to the inside of a standard radii will be misaligned by 0.004 inches when read on a disk drive in which the head is misaligned 0.002 inches to the outside of a standard radii. An error of 0.004 is over one-third of the width of the track, and while generally allowing accurate data transfer, it is a limit beyond which accurate data transfer may become difficult.

The method of utilization of the present invention described above can be easily implemented on a computer. A simple program implementing the process described in the flow chart of FIG. 4 will allow the present invention to be utilized by people of relative little technical knowledge or skill simply by following instructions included within such a computer program. While such a computer program's location is independent of the tracks 21 through 39 of disk 50 from which alignment is determined, a convenient place where the program can be stored is within tracks 00 through 20 on disk 50.

Methods have been developed in the art for measuring RPM of a disk drive with programming and data tracks recorded in standard locations on a disk. Such a program and data can also be included on the disk 50 of the present invention, located within tracks 00 through 20. The consequence of including the RPM testing on the disk of the present invention is that then the disk drive speed and the disk drive head alignment can be conveniently tested with a single disk.

It should be recognized that there are modifications which may be made to the methods described above for utilizing the present invention. For example, tracks 21 through 39 may each be read from both directions. This does two things in particular: first, it eliminates the requirement that track "PA" (track 30) be readable in order to obtain a result; and second, by reading from both directions, it can be determined if the same track is identified as the track of closest alignment with the two directions of approach. If a different track (or pair of adjacent tracks) is determined as being of closest alignment with the two directions of approach, the discrepancy is the backlash or hysteresis of the head movement. If the backlash becomes substantial, maintenance of the head transport system is indicated. While the amount of backlash that is acceptable will vary with particular designs of disk drives, a backlash that amounts to a full track discrepancy (0.0013 inches) is highly questionable.

An additional possible modification, which provides an accuracy enhancement, reflects a recognition that the accuracy of track placement in the manufacture of disks in accordance with the present invention will not be perfect. Manufacturing tolerances will typically result in both variation in track locations from disk to disk, and a variation between average actual track locations and designed locations. By accurately measuring the actual track placement on production disks, a set of measurements representing the average actual locations of the tracks can be obtained. These values, which relate more closely to the actual disk track locations, can be tabularized in the computer program used in application of the disk of the present invention. By utilizing those tabularized values, a program can be devised which will provide a measurement of head alignment with more accuracy than if the design values are assumed.

It also should be recognized that the number of tracks in nonstandard locations and the amount of displacement from standard for each such track are both quantities subject to the goals of a person designing a disk in accordance with the present invention. While the presently preferred embodiment consists of a configuration which provides reasonable resolution and does not require an excessive amount of area on the disk, it can be seen that by establishing the Dim. "C" closer to Dim. "A", finer resolution can be attained. It is necessary, however, to have a sufficient number of tracks on each side of track "PA" to assure that the head will reach a track which it cannot accurately read in each direction. A rule of thumb is to be sure that the furthest track in each direction from track "PA" is a full track width away from the corresponding standard track position. For example, if Dim. "C" were set at only 0.00098 inches less than Dim. "A" to achieve greater resolution, twelve tracks on each side of track "PA" would be required to include extreme tracks with offsets from standard of a full track width. Similarly, if Dim. "C" were set at 0.0024 inches less than Dim. "A", then only five tracks would be required on each side of track "PA", but the resolution would be correspondingly less.

The principle of the present invention would also be achieved if Dim. "C" were set slightly larger rather than slightly smaller than Dim. "A". That would have a minor disadvantage in that an embodiment similar to that illustrated in FIG. 2, but with Dim. "C" larger than Dim. "A" would have to have Dim. "B" significantly smaller than Dim. "A", and would probably result in a need for the complete elimination of track 20. There is also some tendency for the closer arrangement where Dim. "C" is less than Dim. "A" to result in track-to-track interference as the head/track misalignment becomes large, thus forcing data transfer errors at slightly less total alignment error. Since the tendency to force the data transfer error is symmetrical across the track "PA", there is no net effect on the determination as to which track most closely matches the head alignment. There is, however, a reduction in the number of nonstandard tracks required to achieve a determination of alignment to a given degree of resolution.

The group of tracks which allow the alignment testing due to their nonstandard spacing must be grouped around a track which is located in a position corresponding to proper alignment. It is not required, however, that they be the inner most group of tracks. The group can be located on any portion of disk 50 so long as they fall within sectors 52.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An alignment disk comprising:

a disk;

a coating on at least one side of said disk comprising a magnetizable material for magnetically encoding information;

a collection of information magnetically stored in said magnetizable material of said coating in a format including a plurality of data and a plurality of check sums, with the relationship between predetermined portions of said data and associated check sums being such that a comparison of said data and said check sums provides an indication as to the accuracy with which said data is read by a transducer head;

said format in which said information is stored includes a plurality of concentric tracks on said disk, one of said tracks being properly aligned and located such that a center line of said properly aligned track is at a radial distance from the center of said disk equal to the radial distance from the center of said disk of the center line of said transducer head when said transducer head is properly aligned and is positioned for reading said properly aligned track, and a plurality of said tracks are on both sides of said properly aligned track and are located with their center lines radially displaced from the center line of said properly aligned track by distances which differ from the radial distances that said transducer head is able to index by predetermined amounts.

2. The alignment disk of claim 1 further comprising: data tracks containing programming for enabling a computer to test the head alignment of a disk drive through utilization of the concentric tracks.

3. The alignment disk of claim 2 further comprising: data tracks containing information which may be used for testing the RPM of a disk drive.

4. An alignment system comprising:

a magnetic recording media on which data may be stored by magnetization of said magnetic media;

a plurality of alignment tracks on said magnetic media in which a plurality of data is stored comprising a properly aligned track, and a plurality of nonaligned tracks for which the absolute value of the difference between the radial distance representing proper alignment and the actual radial distance of said nonaligned tracks increases with the distance each nonaligned track is from said properly aligned track; and a plurality of program tracks on said magnetic media, the program tracks being properly aligned and containing magnetically encoded thereon a program for enabling a computer to test transducer alignment thrugh utilization of the alignment tracks on said magnetic media;

whereby the alignment of a transducer may be evaluated by testing its ability to correctly read data from said alignment tracks.

* * * * *